Oct. 26, 1965 C. R. LUCHSINGER 3,214,171

MAGNETIC GAME DEVICE

Filed Aug. 8, 1963 5 Sheets-Sheet 1

INVENTOR.
Charles R. Luchsinger

INVENTOR.
Charles R. Luchsinger

MAGNETIC GAME DEVICE

Filed Aug. 8, 1963 5 Sheets-Sheet 3

INVENTOR.
Charles R. Luchsinger

MAGNETIC GAME DEVICE

Filed Aug. 8, 1963 5 Sheets-Sheet 4

INVENTOR.
Charles R. Luchsinger

INVENTOR.

Charles R. Luchsinger

United States Patent Office 3,214,171
Patented Oct. 26, 1965

3,214,171

MAGNETIC GAME DEVICE

Charles R. Luchsinger, Glen Cove, N.Y., assignor to The Luchland Company, Newfoundland, N.J., a partnership Filed Aug. 8, 1963, Ser. No. 302,230
27 Claims. (Cl. 273—85)

This is a continuation-in-part application of application Serial No. 47,202, filed August 3, 1960, entitled Magnetic Game Device, and now abandoned.

This invention relates to magnetic game devices, and more particularly, to devices of this type wherein the magnetic forces between permanently magnetized playing and impelling pieces or members are utilized to effect the necessary movements for playing the games.

In its broad aspects, the present invention contemplates a permanent-magnet playing piece adapted for free translation relative to a non-magnetic playing surface, being positioned in juxtaposed relation to the playing surface with its polar axis perpendicular thereto and being formed and arranged to maintain the same polar relationship to the playing surface at all times. More specifically, the invention is concerned with games of the type wherein the magnetic playing piece or pieces and the impelling member are disposed on opposite sides of a non-magnetic separating sheet, which is preferably transparent, in an arrangement by which either the attractive or the repelling forces of the magnets are utilized to effect the desired movements, and one object of the invention is to provide a novel and improved game device of this type, utilizing either repelling poles or else attracting poles, wherein the magnetized pieces may not unintentionally become reversed polarwise thereby to prevent or defeat the proper playing of the game.

Another object of the invention is to provide a novel game device as above set forth and employing repelling forces between like magnetic poles, wherein an unusual, sudden shooting type action of the playing pieces may be obtained with but a very slight, slow action on the part of the cooperable impelling piece.

A still further object of the invention is to provide a novel magnetic game device of the character stated, wherein the likelihood of a player incorrectly manipulating the impelling members, or of reversing the polarity of the impelling members, is minimized.

A further object of the invention is to provide a novel magnetic game device utilizing either repulsion or else attraction between magnetic playing pieces and impelling members, wherein the motivation principle involved and the basic structures concerned with said principle may be readily utilized with but slight modification in the construction of different individual games, such as the game of pool, the game of hockey, etc.

A feature of the invention resides in the provision of a magnetic game device as above set forth, utilizing attraction and/or repulsion of magnetized members or pieces, wherein a single and simple basic magnetic structure may be utilized for both the playing pieces and also the impelling members or parts which are manually actuated or controlled to set the playing pieces in motion.

Another feature of the invention resides in the provision of an improved, simplified magnetic game device utilizing magnetic playing pieces and impelling members, wherein the magnetization of the said pieces and members is essentially permanent and remains at a relatively high operational level or strength over an extended period of time, thereby insuring that the game device will not become inoperative due to deterioration of the magnetism.

Still another object of the invention is to provide an improved magnetic game device having all of the above features and advantages and which is nevertheless extremely simple in its construction, and economical to fabricate and produce.

Other features and advantages will hereinafter appear.

In the accompanying drawings similar characters of reference have been used to designate like components wherever possible throughout the several views, in which:

FIG. 25 is a top plan view of the game device of FIG. 24;

Figures 1, 2, 3, 4:
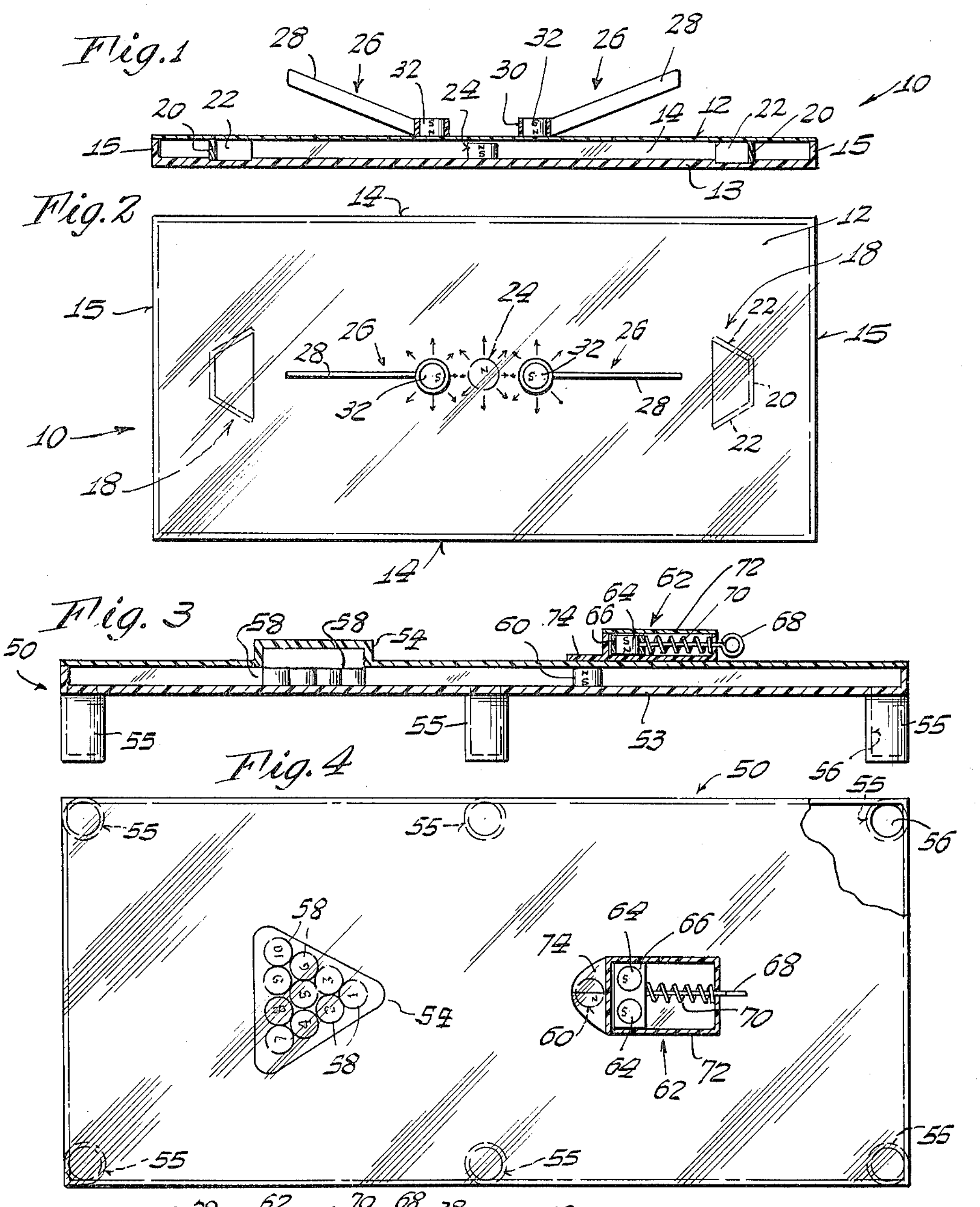
FIG. 1 is a longitudinal vertical sectional view through an improved magnetic game device simulating the game of hockey.
FIG. 2 is a top plan view of the game device shown in FIG. 1.
FIG. 3 is a longitudinal vertical sectional view through a magnetic game device simulating the game of pool.
FIG. 4 is a top plan view of the game device shown in FIG. 3, a portion of the impelling means being shown in horizontal section to reveal interior details.
Figures 5, 6, 7:
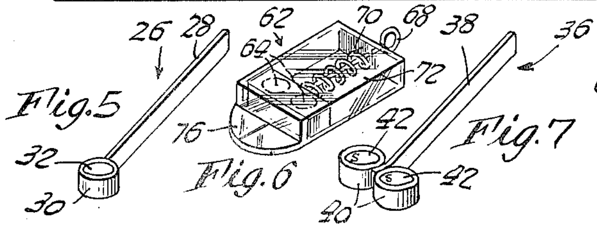
FIG. 5 is a perspective view of one of the impelling members of the type shown in FIGS. 1 and 2.
FIG. 6 is a perspective view of the impelling means of the game device shown in FIGS. 3 and 4.
FIG. 7 is a perspective view of a modified form of impelling member, along the lines of that shown in FIGS. 1, 2 and 5, but employing a plurality of magnet elements.

Referring first to FIGS. 1, 2 and 5 the game device shown therein comprises a playing board 10 which is in the form of a low, flat housing or enclosure having top and bottom walls 12 and 13, side walls 14 and end walls 15. The bottom wall 13 and side and end walls 14, 15 are preferably formed in one piece, as from molded plastic. The top wall 12 is also preferably of plastic, and is made of transparent material to enable playing pieces disposed within the enclosure 10 to be readily viewed.

The game device illustrated in FIGS. 1 and 2 simulates a hockey rink, and for this purpose the enclosure 10 is provided with a pair of "nets" or goal structures 18, each goal structure comprising a back wall 20 and a pair of oblique side walls 22. The goal structures 18 may be formed as separate pieces, as shown, or else they may be molded as integral parts of the bottom wall 13.

In accordance with the present invention, within the housing or enclosure 10 there is provided a single magnetic playing piece 24 which, in the present instance, simulates a hockey puck, said playing piece being magnetized or polarized in such manner that the two opposite poles thereof are located respectively at the top and bottom of the piece. As indicated in the figures, the playing piece 24 has a north pole N at its top and a south pole S at its bottom. Preferably, the playing piece 24 is relatively light in weight, being fabricated of a magnetized ceramic composition, commonly referred to in the electrical arts as a ceramic magnet.

Stated differently, the playing piece 24 is closely confined between the upper and lower walls 12, 13 of the playing field with its polar axis perpendicular thereto. It is preferably in the form of a cylindrical slug or disc, the diameter of which is greater than its axial dimension or thickness. With such construction the playing piece 24 is captive in the sense that it is impossible for it to be upset or turned over, even though it is freely movable for translation within the enclosure 10.

Further, in accordance with the invention, novel impelling members 26 are provided, adapted for manipulation by the players of the game, the said impelling members being especially formed to minimize the likelihood of the players improperly positioning or using them other than to obtain the required action of the magnets.

As shown, each of the impelling members 26 comprises an elongate handle portion 28 having at one end a ringlet or holder portion 30 providing a recess in which a permanent magnet 32 is securely fitted.

The ringlet 30 has a cylindrical bore, as shown, and like the playing piece 24, the permanent magnet 32 is in the form of a cylindrical slug closely fitting within the bore. In accordance with the invention, the axis of the cylindrical bore of the holder 30 and the axis of the magnetic slug 32 carried in the holder are disposed at an acute angle with respect to the longitudinal axis of the handle portion 28. Further, by the present invention the north pole N of the magnetic slug 32 of the impelling member is disposed at the bottom and the south pole S is disposed at the top of the member, as viewed in FIGS. 1, 2 and 5. It is pointed out that because of the cylindrical shape of the magnets, the magnetic flux of each is substantially equal in all directions radially thereof.

By virtue of such disposition of the poles of the impelling members 26 and the poles of the playing piece 24, when the impelling members are positioned as shown in FIG. 1 (which is with the magnetic slug 32 resting flat against the top wall 12 of the playing field), like or repelling magnetic forces will always exist between the impelling member 26 and the playing piece 24. Such repelling forces will become greater as the member is made to approach the playing piece, and if the impelling member should be placed squarely on top of the playing piece, the repelling force will be a maximum but no movement of the playing piece will result since the opposing fluxes will be in equilibrium, so to speak, and will be perfectly counter-balanced whereby the separating force on the piece 24 will be directed vertically downward, holding the piece tightly against the bottom wall 13 of the housing or playing field. If, when the impelling member 26 is so positioned with respect to the playing piece, the member should be shifted a slight amount to any side, the opposing fluxes will become unbalanced, and a very strong and powerful horizontal component of the repelling force will be created in the playing piece 24, resulting in the latter shooting away from the impelling member at a very rapid rate, and with a sudden movement. This shooting movement may be likened to the sudden squirting of juice from crushed fruit, and the term "squish" is used herein to describe this sudden, shooting-type movement of the playing piece away from the impelling member when the latter is shifted slightly to one side of a dead center position as above explained.

Instead of using such sudden shooting or "squishing" movement, the impelling member 26 may be made to either slowly or rapidly approach the playing piece 24 from a direction generally laterally of the playing piece. In such case the repelling force will be gradually increased, and as the restraining friction on the playing piece 24 is overcome the said piece will be shifted by the repulsion in a direction away from the impelling member 26. Either or both such actions may be utilized in playing the hockey game illustrated herein. Two of the impelling members 26 are provided, one member being utilized by each of two players of the game. Various rules may be followed in playing the game, as will be readily understood.

An important feature of the present game construction embraces the provision of a polarized playing piece which is confined against turning within the enclosure 10 and which is vertically polarized so that it has its opposite poles at the top and bottom, whereby one such pole will always remain uppermost. In conjunction with such construction, the provision of impelling members for either repelling the playing piece or else attracting the same, will result in a procedure by which the particular force being used (either the attracting or else the repelling force), will not be unintentionally reversed during the playing of the game, but instead such force will remain consistently in effect. That is, if the game is based upon repulsion, as in the illustrated embodiment of the invention, such repulsion will exist at all times that the playing members 26 are properly positioned in the most convenient manner, as when the handle portions 28 extend angularly upward while the magnetic slugs 32 are resting flat upon the top wall 12 of the playing field. The above construction constitutes an important feature and advantage of the present invention.

At the goal structures 18, the thickness of the bottom wall 13 of the enclosure may be slightly reduced, to provide a retention of the playing piece 24 in the goal against accidental dislodgement, if this should be desired.

In place of the impelling members 26 illustrated in FIGS. 1, 2 and 5, a modified form of impelling member 36 may be provided, as illustrated in FIG. 7. The member 36 shown therein comprises a handle portion 38 extending angularly upward from a pair of ringlets or holder portions 40, the latter being provided with magnetic slugs 42 disposed with their like poles uppermost and lowermost. The impelling member 36 illustrated in FIG. 7 may be centralized over the playing piece 24 either in the manner described above in connection with the impelling member 26 (although this is somewhat more difficult to achieve), or it may be positioned so that the playing piece 24 is midway between the two magnetic slugs 42 and directly in line therewith. Otherwise, the manipulation of the impelling member 36 is generally similar to that described in connection with the impelling member 26 shown in FIGS. 1, 2 and 5.

Figure 5C:
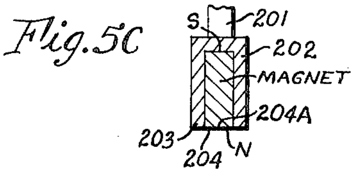
FIG. 5C is a sectional view taken along line 5C—5C of FIG. 5A.
Figure 5A:
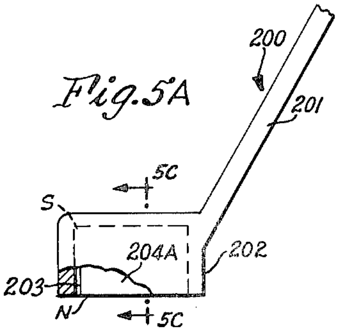
FIG. 5A is a side view of a modified impelling means of the type shown in FIGS. 1 and 2.
Figure 5B:
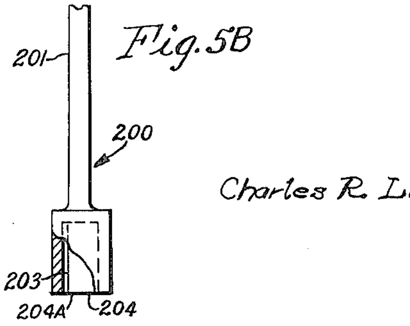
FIG. 5B is a front view of the impelling means of FIG. 5A.

FIGS. 5A, 5B and 5C illustrate a modified form of impelling means. In this form the impelling means 200 is constructed to simulate a hockey stick. As shown, the stick 200 comprises an elongated handle portion 201 which has formed on one end thereof a substantially rectangularly shaped holder 202 formed with a recess 203 therein in which a permanent bar magnet 204 is securely fitted. The arrangement is such that the lower flat face 204A of the bar magnet constitutes the north pole N of the magnet. Thus, as hereinbefore described when the pole N of the impelling member is positioned relative to pole N the playing piece 24 a like or repelling magnetic force will always exist between the member and the playing piece.

While this embodiment of the invention has been shown and described as simulating the game of hockey, it is pointed out that with but slight modification of the goal structures (and played under a different set of rules) a game device is available which simulates the game of basketball. Therefore, it is not intended that the foregoing disclosure be strictly limited in any manner to a simulation of the game of hockey and the disclosure should not be so construed.

In the embodiment of the invention illustrated in FIGS. 3, 4 and 6, the magnetic principle explained above is utilized in a game device which simulates the game of pool. As shown, the playing "table" comprises a low, flat housing or enclosure 50 which is similar generally to the enclosure 10 described above, with the exception that the bottom wall 53 thereof is provided at its corners and also midway of its side edges with depending tubular portions 55 having recesses or bores 56 adapted to loosely receive a plurality of non-magnetic playing pieces 58 in the form of cylindrical slugs representative of pool balls. As many as three of the slugs 58 may be accommodated in any of the depending portions 55 of the playing table; the said portions may also conveniently constitute legs for the playing table 50, as will be understood.

At a distance from one end, the left-hand end in FIGS. 3 and 4, the top wall of the housing 50 is formed with a slightly recessed triangular area 54, which is provided for "racking" the pieces 58 preparatory to the commencement of play. This is accomplished by turning the housing upside down to let the pieces 58 drop out of the pockets 55 and by gently tilting and shaking or vibrating the housing to move the pieces 58 into the area 54. The housing walls are flexible enough so that they can be pinched together to hold the pieces in racked condition while the housing is turned upright, whence the pinching pressure can be relieved and the pieces 58 will rest in proper position on the bottom wall 53.

The shooting or "cue" ball piece of the pool game comprises a magnetic playing piece 60 which may be similar to the playing piece 24 already described above. The pieces 58 and 60 are so constructed that they may not be turned over, but instead will always remain in their initially given upright positions between the top and bottom walls of the enclosure or "table" shown. The playing piece 60 constituting the cue ball is shown as having a north pole at its top face and a south pole at its bottom.

As an impelling means, there is provided a spring powered device 62 comprising a pair of permanent magnets 64 rigidly affixed to a common carrier 66 which is connected with a plunger 68 and is under the influence of a compression coil spring 70. The plunger 68, spring 70 and carrier 66 containing the magnets 64 are carried in a small rectangular housing 72 having a transparent, positioning extension 74 projecting from its bottom wall. The spring device 62 may be variously positioned on the playing "table," and upon the plunger 68 being pulled and released, the carrier 66 and magnets 64 will be suddenly shifted, this movement being utilized to impart by magnetic force a driving movement to the playing piece 60. As seen in FIG. 3, the magnets 64 have their north poles disposed at the bottom faces thereof, thereby to employ a repelling force in the driving of the playing piece 60.

In use, the playing piece 60 is placed in the desired position on the "table" (within the housing 50) and the spring powered device 62 is then brought close to the piece 60, preferably with the latter having a position as viewed through the transparent extension 74 (see FIG. 4). Upon the plunger 68 being pulled and thereafter released, a driving force will be imparted to the playing piece 60, and in the event that it strikes the pieces 58, these will have motion imparted to them, as in the manner of playing pool.

As seen in FIG. 6, a center or positioning line 76 may be provided on the transparent extension 74, to aid in centralizing the power device 62 with the playing piece 60.

The object of the game is to drive the greatest number of pieces 58 in to the "pockets" 55 provided in the playing "table."

As thus far described, it will now be understood from the foregoing that I have provided a novel and improved mganetic game device employing a unique principle involving either repulsion or attraction of magnetized pieces or members, in an arrangement whereby unintentional reversal of either the desired repulsive force or the desired attractive force is obviated. So long as the impelling members 26 or 36, and the spring device 62 are properly positioned in the manner indicated in the drawings, there will always exist a repelling force between the impelling means and the playing piece. Or, if the playing piece is initially poistioned so that its polarity is the opposite of that shown, there will always exist an attractive force between the impelling member and the playing piece, and such force will not become unintentionally reversed during the playing of the game, thereby to interfere with the game action and the rules as agreed upon. The game devices as illustrated herein are seen to be simple in construction, and economical to fabricate and produce.

By virtue of the separation between the impelling members and the playing pieces, as effected by the top wall 12 of the playing enclosure, it is not possible to completely bring together the opposing poles of the impelling member and playing piece, and accordingly, there is not likely to be any appreciable deterioration of the magnetic forces involved.

Figure 8:
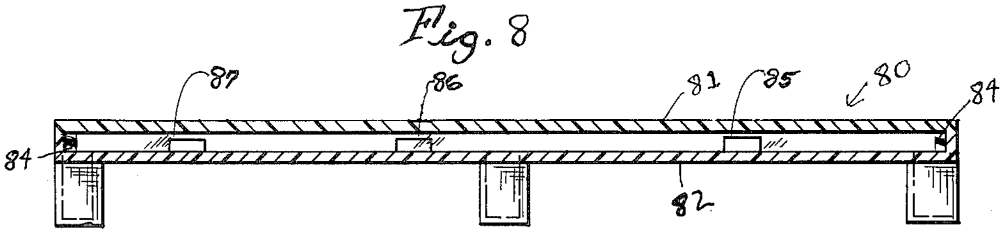
FIG. 8 is a longitudinal vertical sectional view through a magnetic game device simulating the game of billiards.
Figure 9:
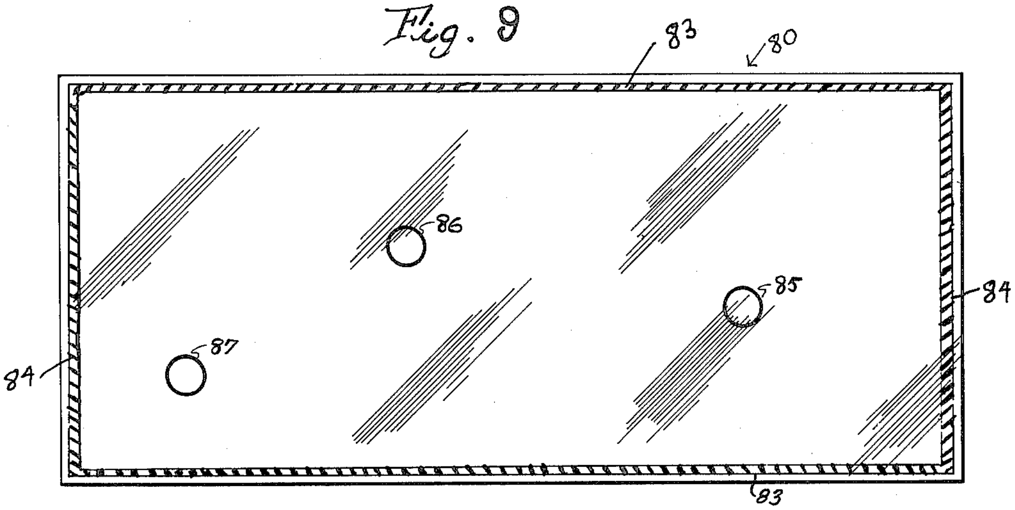
FIG. 9 is a top plan view of the game device of FIG. 8.

A device for playing a game simulating billiards is shown in FIGS. 8 and 9, wherein a housing 80 having spaced-apart top and bottom walls 81 and 82, respectively, is formed with interiorly cushioned side walls 83 and end walls 84, the cushioning material preferably being foam rubber or the like. In this embodiment, two magnetized playing pieces 85 and 86, and one non-magnetized playing piece 87, are employed within the housing and, of course, an impeller is used which may be the same as any one of those heretofore described. In this game, the impeller is used to "shoot" one of the magnetized pieces, say the piece 85, to hit the other magnetized piece 86, which in turn must hit the non-magnetized piece 87 to score. As in billiards, the side and end cushions are intended to be made use of during the playing, whereby a playing piece may be bounced off one or more cushions before (or after) striking another playing piece.

Figures 10, 11, 12, 13, 14, 15:
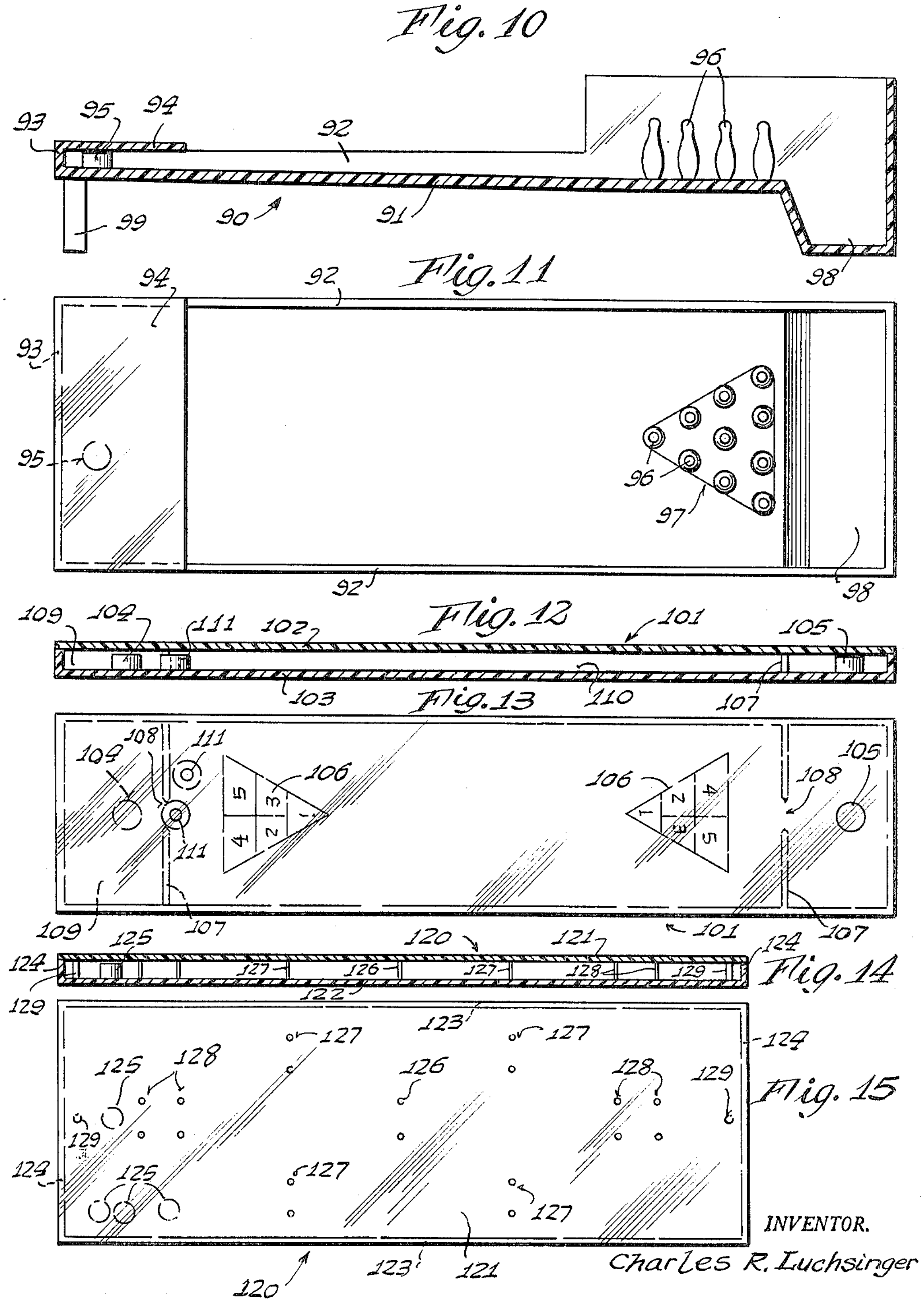
FIG. 10 is a longitudinal vertical sectional view through a magnetic game device simulating the game of bowling.
FIG. 11 is a top plan view of the game device of FIG. 10.
FIG. 12 is a longitudinal vertical sectional view through a magnetic game device simulating the game of shuffleboard.
FIG. 13 is a top plan view of the game device of FIG. 12.
FIG. 14 is a longitudinal vertical sectional view through a magnetic game device simulating the game of croquet.
FIG. 15 is a top plan view of the game device of FIG. 14.

In FIGS. 10 and 11 there is shown an embodiment of the invention which is for playing a game simulating the game of bowling. In this instance, a housing 90 is formed with a bottom wall 91, side walls 92 and end walls 93. A top wall 94 is removably fitted in place and covers a limited area only at the end from which a magnetized playing piece 95 is "squished" toward ten-pins 96 set up at the opposite end of the housing. The bottom wall 91 which corresponds to the alley of the real game of bowling is formed preferably to slope downward slightly toward the pin end to give added speed and distance to the "squished" playing piece 95; and the surface thereof can be kept cleaned and slickened by the use of any of the well known silicone treated cloth or tissue wipers. A guide structure 97 is marked off on the bottom wall 91 to facilitate the proper setting up of the pins 96 and a well or pit 98 is formed immediately behind the guide 97 in which pins knocked down in playing the game are temporarily collected before being re-set. Because the bottom wall 91 is intended to be inclined and is made uneven by the formation of the pin 98, the device is supported on legs 99 suitably located to project therefrom, or, if desired, a false bottom can be provided and formed to cause the device as a whole to sit level. The playing piece 95 is set into motion by an impelling member, preferably of the type used for the game of pool, as shown in FIG. 6 and designated by the numeral 62.

Another embodiment of the invention is shown in FIGS. 12 and 13. In this instance the device is for playing a game simulating the game of shuffleboard. As shown, the housing 101 is rectangular in shape and its top and bottom walls 102 and 103, respectively, are spaced apart a distance but slightly greater than the axial dimension of a pair of permanent-magnet playing pieces 104 and 105, whereby the latter are free for translation within the housing 101, but for a limited extent only as will be explained hereinafter.

Near each end of the housing there is formed or printed, preferably on the bottom wall 103, a triangular scoring or goal structure 106, marked off with numerical scoring points. Rearward of the base of each triangular structure 106 and spaced slightly therefrom is a vertical partition 107 extending between the top and bottom walls and formed with a centrally located aperture 108, the width of which is slightly less than the diameter of the playing pieces 104 and 105. The partitions 107 each define an enclosed area 109 in which the playing pieces are confined. Located in a center area 110 between the partitions 107 are two non-magnetic discs 111 adapted for translation throughout the area 110. Actually, there are eight discs, four of one color and four of a different color, the game usually being played by two teams of two players each with two opponents taking positions at opposite ends of the playing board. Each disc 111 is provided with a metallic, magnetically attractive pin, whereby the discs are movable by magnetic attraction into position for playing the game. The discs 111 also have a diameter greater than the width of the apertures 108 to prevent their passage therethrough.

The play of the game is controlled by the use of any one of the impelling members 26, 36 or 62 heretofore described and shown in FIGS. 5, 6 and 7.

To play the game of shuffleboard, one of the two players at one end of the game device (the left-hand end in FIGS. 12 and 13), provided with an impelling member, say like the member 26, utilizes the attractive force of the magnet carried thereby to position a disc 111 of the color being used by his team in the aperture 108 of the partition at that end of the housing 101. Also using the attractive force of the impelling magnet, he moves the playing piece 104 to whatever position he desires within the area 109. Then, using the repelling force of the impelling member, he "squishes" the playing piece toward the aperture 108 where it forcibly strikes the disc 111 positioned in the aperture. Since the diameter of the playing piece is too great to let it pass through the aperture 108, it strikes the disc 111 a sharp blow and stops, sending the disc 111 toward the triangular scoring structure 106 at the opposite end of the center area 110. Where the disc 111 stops is dependent upon the skill and accuracy of the player manipulating the impelling member. The opponent at that end of the game device places one of the discs 111 used by his team in the aperture 108 and goes through the same procedure, his objective, however, being either to shoot the disc 111 onto a higher score area of the triangular structure 106 or to bump the opponent's disc therefrom and possibly leave his disc in a scoring area. This play is repeated until all of the discs have been put into play, the score made, if any, is tallied, and the players at the opposite end of the game device go through a like performance to try for a score at the opposite triangular structure 106, and so on until a winning total score has been tallied by one team of the players, all as is usual in a regular game of shuffleboard.

A device simulating the game of croquet is shown in FIGS. 14 and 15, wherein the housing 120 is formed of top and bottom walls 121 and 122, respectively, side walls 123 and end walls 124, the top and bottom walls being spaced apart just enough to accommodate magnetic playing pieces 125 for translation between them. The bottom wall 122 is marked off with wickets laid out to resemble the conventional arrangement for the game of croquet, there being a center wicket 126, two side wickets 127, two end wickets 128, and an end stake 129 in each of the areas between the center wicket and the end walls of the housing 120. In order to make the game realistic, and in the preferred embodiment shown in FIGS. 14 and 15, the wickets and end stakes are defined by posts formed on and projecting upward from the bottom wall 122, whereby the game is made to require a skill comparable to the real game of croquet.

Any desired number of playing pieces 125, variously colored for identification may be located in the housing 120, any two or more of which may be put into play depending upon the number of players involved at the time. Each player is provided with an impelling member which preferably is the same as the member 26 shown in FIG. 5. The impelling member is used to "squish" the playing pieces by magnetic repulsion as already described and the action, including "bumping" etc. is carried out all in accordance with the rules for the conventional game of croquet.

Figures 16, 17, 18, 19, 20, 21:
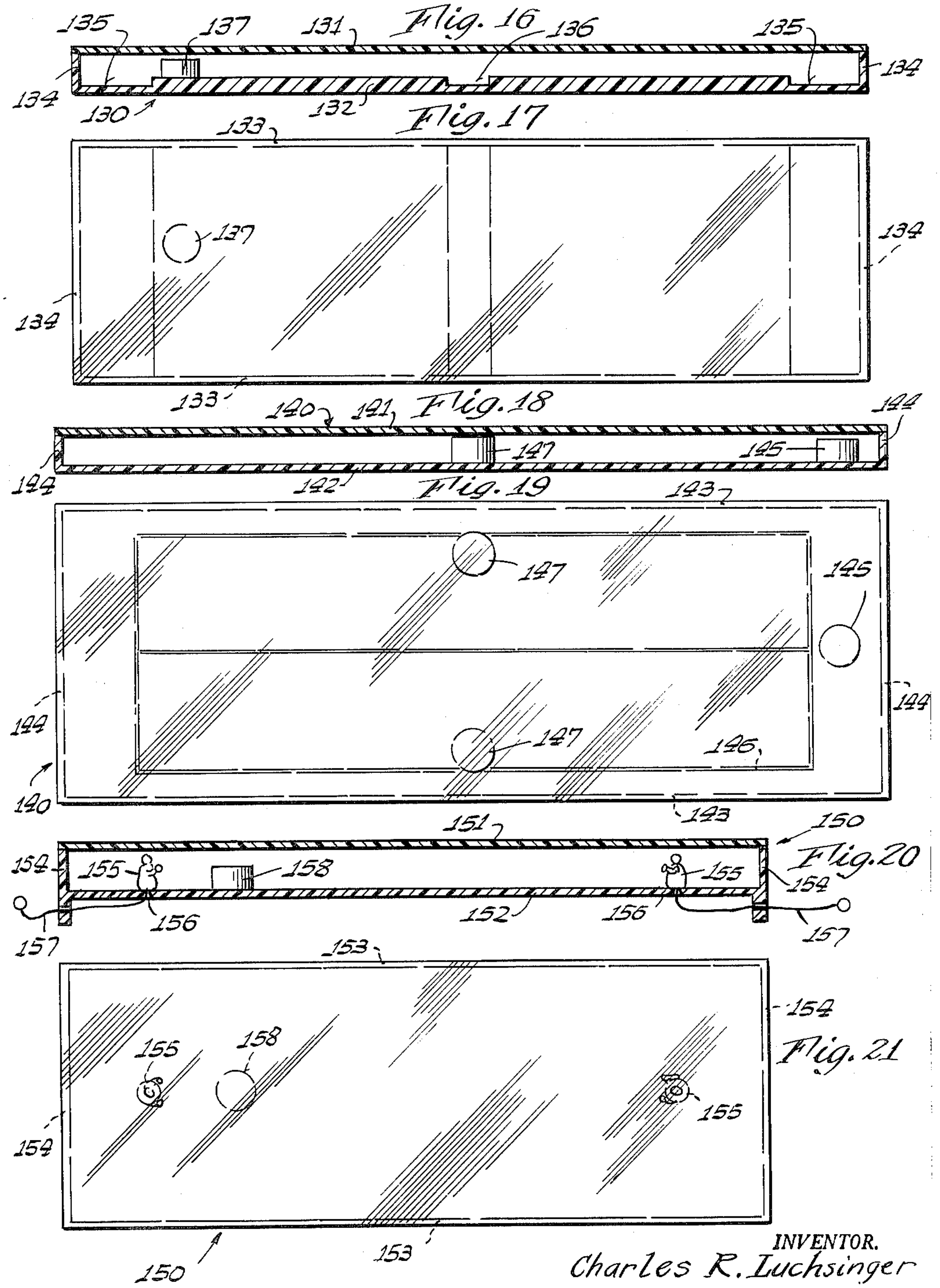
FIG. 16 is a longitudinal vertical sectional view through a magnetic game device simulating the game of Ping-pong.
FIG. 17 is a top plan view of the game device of FIG. 16.
FIG. 18 is a longitudinal vertical sectional view through a magnetic game device simulating the game of tennis.
FIG. 19 is a top plan view of the game device of FIG. 18.
FIG. 20 is a longitudinal vertical sectional view through a fagnetic game device simulating the game of boxing.
FIG. 21 is a top plan view of the game device of FIG. 20.

A game device simulating the game of Ping-pong is shown in FIGS. 16 and 17, wherein a housing 130 is formed with top and bottom walls 131 and 132, respectively, side walls 133 and end walls 134. In this instance the surface provided by the bottom wall 132 is marked off by a transverse depression or gutter 135 formed at each end, and the "net" is defined by a transverse gutter 136 centered with respect to the end walls 134. A single permanent-magnet playing piece 137 is provided and is adapted to be activated in play preferably by an impelling member 26 of the type shown in FIG. 5. The gutters 135 and 136 are slightly greater in width than the diameter of the playing piece 137 so that the latter may drop therein under certain circumstances.

The playing surface is that area between the end gutters 135 and represents the top surface of a Ping-pong table, while the gutter 136, as stated, represents the net into which the playing piece will drop if not impelled with sufficient speed to "jump" the gutter. The end gutters 135 represent areas beyond the table top and when the playing piece is impelled with such force and to drop into a gutter 135 it is considered as being off the table. The rules of the conventional game of Ping-pong can be followed in using the present game device.

Perhaps one of the most interesting and realistic forms of the game device of the present invention is the simulated game of tennis shown in FIGS. 18 and 19. As there shown, a housing 140 is formed with top and bottom walls 141 and 142, respectively, spaced apart by side walls 143 and end walls 144 a distance just sufficient to permit the permanent-magnet playing piece 145 to have free translation therebetween. The playing piece 145 is adapted to be moved by an impelling member of the types heretofore described and shown in FIGS. 5 and 6 as the members 26 and 36.

The bottom wall 142 is marked off by court lines 146 as is the conventional tennis court and a unique form of "net" is provided. As will be seen in the drawing, a permanent-magnet disc 147 like the playing piece 145 is fixedly located centrally and laterally of the marked off court as would be the net posts of the conventional tennis court. The discs 147 each send out a magnetic flux which gradually diminishes toward the longitudinal center line of the court. The disc playing piece 145 also radiates a magnetic flux and when the playing piece 145 is in the magnetic field of the discs 147, the fluxes of the three are opposing or repelling forces. Hence, if the playing piece 145 is impelled with sufficient speed from a court area on one side of the "net" in a path substantially dead center between the discs 147, it will force its way into the magnetic fields radiated by the discs 147 and be forced out into the opposite court area under the added impetus of the fluxes from the discs 147. On the other hand, when the playing piece is impelled in a path substantially off dead center between the discs 147, it will bounce back from the "net" or ricochet from one magnetic field to the other until such time as it eventually has bounced clear of the influences of the magnetic fields set up by the discs 147. Of course, when it is desired to transfer the playing piece 145 from one player or court to another, it may be guided past the net by an impelling member 26 or 36, whichever type is used, either by an attractive or a repelling force according to the way the impelling member is manipulated.

A game device simulating boxing is shown in FIGS. 20 and 21, wherein a housing 150 having top and bottom walls 151 and 152, respectively, separated by side walls 153 and end walls 154. Within the housing there are located two simulated opponents 155 standing freely on the bottom wall 152 each above a small aperture 156. A string 157 extends through the aperture and below the bottom wall to a point beyond the respective end wall 154, whereby the figure 155 may be pulled to an erect position.

A single playing piece 158 is employed together with any form of the impelling members 26, 36 or 62, and the object is to "squish" the playing piece and attempt to strike and knock down the figure 155 representing the opponent's boxer. A simple set of rules is employed such as the playing piece being set in motion from a particular spot at the outset and after a knock-down and from the spot where it comes to rest after a "miss." The first figure 155 to be knocked down ten times is the winner.

Figure 22:
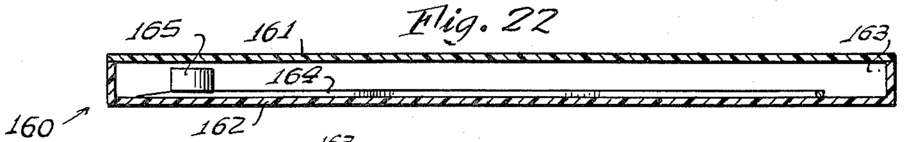
FIG. 22 is a longitudinal vertical sectional view through a magnetic game device referred to as a game of "Straddle;"
Figure 23:
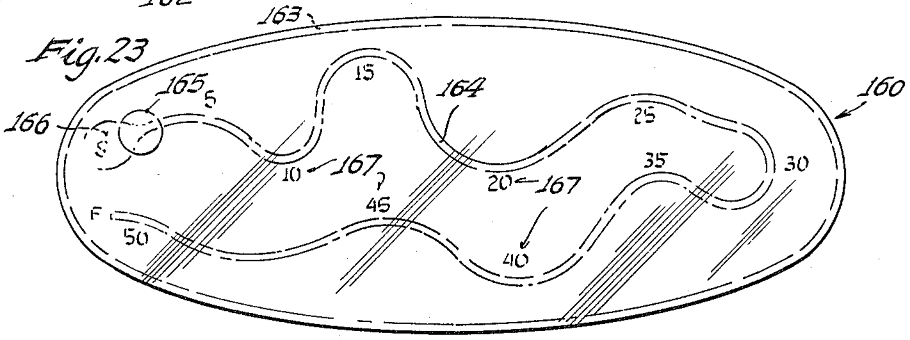
FIG. 23 is a top plan view of the game device of FIG. 22.

Referring now to FIGS. 22 and 23, a novel game called "Straddle" and requiring practiced skill is shown. In this game device a generally oval-shaped housing 160 is formed with top and bottom walls 161 and 162, respectively, separated by a side wall 163, and an irregularly winding track 164 is laid out or formed as a flat-topped rib rising slightly from the bottom wall. A single playing piece 165 having a radially dimension or width greater than the track 164, and preferably the type of impelling member 26 shown in FIG. 5 are employed. The object of the game is to place the playing piece at a starting point 166 on the track 164 and try to guide it by "squishing" along the track. At intervals along the track 164 numerals of increasing values are marked off as at 167 for scoring the player's skill in keeping the playing piece on the track.

Figures 24, 25:
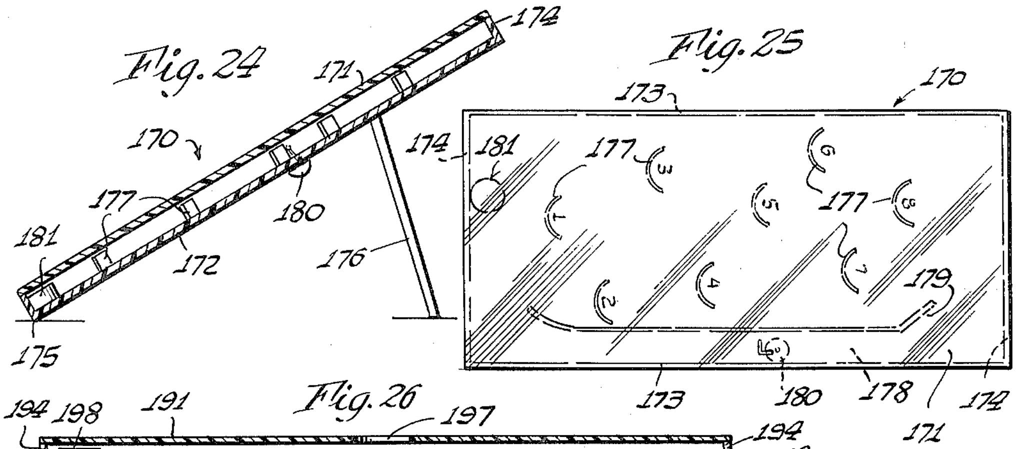
FIG. 25 is a longitudinal vertical sectional view through a magnetic game device referred to as a game of "Hill Climber;"

A game called "Hill Climber" is shown in FIGS. 24 and 25. The device comprises a housing 170 formed with top and bottom walls 171 and 172, respectively, side walls 173 and end walls 174, and the housing is disposed for play in an inclined position resting on the bottom edge 175 of one end and supported by a leg or standard 176 connected to the bottom wall 172 at a point about midway between its center and the opposite end. The bottom wall 172 is formed on its inner surface with a series of semi-circular partitions 177 forming stations arranged in staggered relation to one another, and at one side a chute 178 is formed, flared at its upper end, as at 179, and extending downward to within a short distance from the lower end of the housing. A bell 180 is positioned about midway of the length of the chute 178.

A magnetized playing piece 181, adapted to be moved by an impelling member such as the member 26, is provided within the housing 170 and the play of the game is to "squish" the playing piece from one station to another and from the uppermost station into the chute 178 for the successful completion of the play, the bell being sounded by the playing piece 181 as it slides down the chute on its return to the lower end of the housing. Each station is marked with a numerical value, increasing from bottom to top, for the purpose of tallying a total score.

Figures 26, 27:
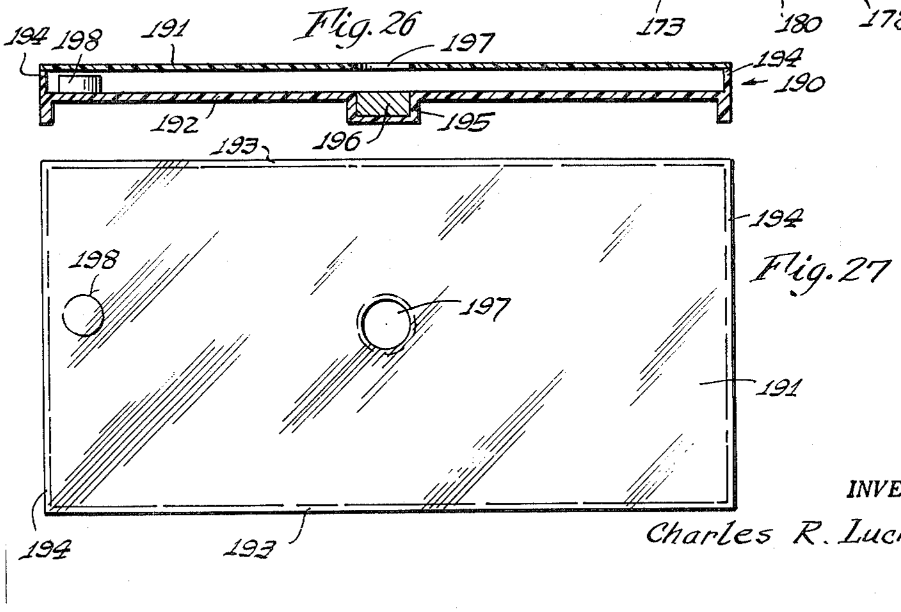
FIG. 26 is a longitudinal vertical sectional view through a magnetic game device referred to as a game of "Pop Out;"
FIG. 27 is a top plan view ofthe game device of FIG. 26.

The game device shown in FIGS. 26 and 27 is one called "Pop Out." The device comprises a housing 190 formed with top and bottom walls 191 and 192, respectively, side walls 193 and end walls 194. The bottom wall is formed with a recess 195 adapted to hold stationary a permanent-magnet disc 196 with its polar axis perpendicular to the horizontal plane of the bottom wall 192 and the top surface of the disc 196 flush with the top surface of the bottom wall. In vertical alignment with the disc 196, the top wall 191 is formed with an aperture 197.

A single permanent-magnet playing piece 198, disc-shaped and of slightly less diameter than the aperture 197, is employed and adapted to be moved by an impelling member such as any one of the members 26, 36 or 62. The lower pole of the playing piece 198 has the same polarity as the upper pole of the stationary disc 196. The play of the game is to "squish" the playing piece 198 in the direction of the disc 196. If the playing piece 198 moves with sufficient speed and is directed accurately enough to pass substantially dead center over the stationary disc 196, the opposing and repelling forces of the disc 196 and playing piece 198 will cause the latter to "pop" out through the aperture 197. If the direction of the playing piece 198 is less accurate, the said opposing forces will cause the playing piece to veer off laterally of the disc 196 and remain within the housing 190 for further play.

In the accompanying drawings, the invention has been shown merely by way of example and in preferred forms and obviously many variations and modifications may be made therein and in its mode of application. It is to be understood, therefore, that the invention is not limited to any specific form or embodiment thereof, except insofar as such limitations are set forth in the appended claims.

I claim:

1. A magnetic game comprising:

(a) a playing board having spaced apart parallelly disposed top and bottom walls; and circumferentially extending opposed side and end walls interconnected between said top and bottom walls to define an enclosure forming an unobstructive playing area, (b) said walls defining said enclosure being formed of a non-magnetic material, and (c) said top wall being transparent, (d) a magnetic playing piece confined between the top and bottom walls within said enclosure, (e) said playing piece being substantially circular in radial cross-section and having a diameter greater than its length, (f) the length of said playing piece being slightly less than the spacing between said top and bottom walls whereby said playing piece is rendered freely movable between said top and bottom walls and while begin maintained captive therebetween so that its polar axis is maintained substantially normal to said top wall at all times, (g) said playing piece having opposed flat faces which define the polar ends thereof, (h) opposed goal structures disposed between said top and bottom walls within the enclosed playing area, (i) and an impelling means adapted to operate on said playing piece to effect the free translation thereof within said enclosed playing area, (j) said impelling means comprising a permanent magnet having a flat polar face and having its polar axis disposed parallel to the polar axis of said playing piece whereby said impelling magnet is disposed for movement over the external surface of said top wall so as to present a magnetic pole of the same polarity to that exposed by the playing piece to the top wall whereby translation of the playing piece is effected by the repelling forces of said like poles, (k) and said impelling magnet being of circular cross-section so that the magnetic fluxes of said playing piece and impelling means operating thereon are substantially uniform in all directions radially thereof, (l) and a handle means connected to said impelling magnet to manipulate the same at will, (m) said handle means being formed of a non-magnetic material, (n) and said handle means including an upwardly angled handle so as to insure that the proper pole of the impelling means is properly presented to said top wall and playing piece so as to effect the desired repelling effect on the playing piece at all times.

2. A magnetic game comprising (a) a playing board having spaced apart parallel top and bottom walls, and circumferentially extending opposed side and end walls interconnected between said top and bottom walls to define an enclosure forming an unobstructive playing field, (b) said walls defining said enclosure being formed of a non-magnetic material, and (c) said top wall being transparent, (d) a playing piece of a permanent magnetic material confined between the top and bottom walls within said enclosure, (e) said playing piece being substantially circular in radial cros-section and having a diameter greater than its length, (f) the length of said playing piece being slightly less than the spacing between said top and bottom walls whereby said playing piece is rendered freely movable between said top and bottom walls while being maintained captive therebetween so that its polar axis is maintained substantially normal to said top wall at all times, (g) said playing piece having opposed flat faces which define the polar ends thereof, (h) opposed goal structure disposed between said top and bottom walls within the enclosed playing field, said goal structure being disposed adjacent the end walls of said enclosure, (i) said goal structure including a back wall and a pair of oblique side extensions, (j) said goal structure being connected to and between the top wall and bottom walls, (k) and an impelling means adapted to operate on said playing piece to effect the free translation thereof within said enclosed playing field.

(l) said impelling means comprising a permanent magnet having a flat polar face with its polar axis disposed parallel to the polar axis of said playing piece, (m) said impelling magnet being disposed for movement over the external surface of said top wall so as to present a magnetic pole of the same polarity as that exposed by the playing piece to the top wall whereby translation of the playing piece is effected by the repelling forces of said like poles, (n) and said impelling magnet being of circular cross-section whereby the magnetic fluxes of said playing piece and impelling means operating thereon are substantially uniform in all directions radially thereof, (o) and a handle means connected to said impelling magnet to manipulate the same at will, (p) said handle including a ring portion for encircling the impelling magnet, and a handle connected to said ring portion, (q) and said handle being angled upwardly from said ring portion so as to insure that the magnet of said impelling means is properly oriented to said top wall and playing piece at all times, (r) and said handle means being formed of a non-magnetic material.

3. A magnetic game comprising (a) a playing board having spaced apart parallelly disposed top and bottom walls; and circumferentially extending opposed side and end walls interconnected between said top and bottom walls to define an enclosure forming a playing area, (b) said walls defining said enclosure being formed of a non-magnetic material, and (c) said top wall being transparent, (d) a magnetic playing piece confined between the top and bottom walls within said enclosure, (e) said playing piece being substantially circular in radial cross-section, (f) the height of said playing piece being slightly less than the spacing between said top and bottom walls whereby said playing piece is rendered freely movable between said top and bottom walls and while being maintained captive therebetween so that its polar axis is maintained substantially normal to said top wall at all times, (g) said playing piece having opposed flat faces which define the polar ends thereof, (h) opposed goal structures disposed between said top and bottom walls within the enclosed playing area, (i) and an impelling means adapted to operate on said playing piece to effect the free translation thereof within said enclosed playing area, (j) said impelling means comprising a permanent magnet having a flat polar face and having its polar axis disposed parallel to the polar axis of said playing piece whereby said impelling magnet is disposed for movement over the external surface of said top wall so as to present a magnetic pole of the same polarity to that exposed by the playing piece to the top wall whereby translation of the playing piece is effected by the repelling forces of said like poles, (k) and a handle means connected to said impelling magnet to manipulate the same at will, (l) said handle being formed of a non-magnetic material, (m) and said handle means including an upwardly angled handle so as to insure that the proper pole of the impelling means is properly presented to said top wall and playing piece so as to effect the desired repelling effect on the playing piece at all times.

4. A magnetic game comprising (a) a playing board having spaced apart parallelly disposed top and bottom walls; and circumferentially extending opposed side and end walls interconnected between said top and bottom walls to define an enclosure forming a playing area, (b) said walls defining said enclosure being formed of a non-magnetic material, and (c) said top wall being transparent, (d) at least one magnetic playing piece confined between the top and bottom walls within said enclosure, (e) the height of said playing piece being slightly less than the spacing between said top and bottom walls whereby said playing piece is rendered freely movable between said top and bottom walls and while being maintained captive therebetween so that its polar axis is maintained substantially normal to said top wall at all times, (f) said playing piece having opposed substantially flat faces which define the polar ends thereof, (g) means disposed between said top and bottom walls within the enclosed playing area, said means being operatively associated with said playing piece for determining the object of the game, (h) and an impelling means adapted to operate on said playing piece to effect the free translation thereof within said enclosed area, (i) said impelling means comprising a permanent magnet having a flat polar face and having its polar axis disposed parallel to the polar axis of said playing piece whereby said impelling magnet is disposed for movement over the external surface of said top wall so as to present a magnetic pole of the same polarity to that exposed by the playing piece to the top wall whereby translation of the playing piece is effected by the repelling force of said poles, (j) and a handle means connected to said impelling magnet to manipulate the same at will, (k) said handle means being formed of a non-magnetic material, (l) and said handle means including an upwardly angled handle so as to insure that the proper pole of the impelling means is properly presented to said top wall and playing piece so as to effect the desired repelling effect on the playing piece at all times.

5. A combination as in claim 4, wherein the means of paragraph (g) include pockets formed to receive playing pieces and arranged to adapt the device for playing a game simulating pocket pool.

6. A combination as in claim 5, wherein a plurality of non-magnetic playing pieces are disposed within the enclosure and adapted to be struck and set in motion by said permanent-magnet playing piece.

7. A combination as in claim 5, including a structure adapted for racking the playing pieces as in the game of pocket pool for the commencement of a game.

8. A combination as in claim 4, wherein the impelling member is a substantially cylindrical solid formed with flat end surfaces which constitute the magnetic poles thereof, and wherein the handle is formed at one end with a socket in which the impelling member is fixed and disposed with one of said flat surfaces in position for engagement with the exterior surface of the top wall.

9. A combination as in claim 8, wherein the handle is formed at one end with a plurality of sockets in each of which an impelling member is fixed and all impelling members are positioned with like poles disposed for engagement with the exterior surface of the top wall.

10. A combination as in claim 4, wherein a plurality of permanent-magnet playing pieces are disposed relative to the top wall in the same positions polarwise.

11. A combination as in claim 4, wherein a plurality of permanent-magnet playing pieces are disposed relative to the same top or bottom wall in the same positions polarwise, and including a non-magnetic playing piece arranged to cooperate with the magnet playing pieces.

12. A combination as in claim 4, wherein a plurality of permanent-magnet playing pieces are disposed relative to the top or bottom walls in the same positions polarwise, and including means extending around the interior surfaces of the side and end walls to form a resilient bumper against which the playing pieces strike and rebound.

13. A combination as in claim 4, wherein a non-magnetic playing piece and two magnetic playing pieces are disposed relative to the walls with the two magnetic playing pieces in the same position polarwise, and wherein a bumper of foam rubber material against which the playing pieces strike and rebound is arranged around the interior surfaces of the side and end walls.

14. A combination as in claim 4, wherein the side and end walls are relatively low and connect with the top and bottom walls together along their edges to form a shallow housing of substantial area and the top and bottom wall are sufficiently thin and flexible to permit movement thereof toward and away from one another, and wherein the top wall is formed with a recess in which to collect and arrange playing pieces and position them for commencement of the play of the game.

15. A combination as in claim 4, wherein the playing area is adapted to simulate a bowling alley and is formed rectangular in shape with a depressed area at one end corresponding to a bowling alley pit, and wherein a portion of said area immediately in advance of the pit is formed to provide for the setting up of non-magnetic ten pin elements.

16. A combination as in claim 15, wherein the playing area is formed at a slight downward inclination toward the said pit end.

17. A combination as in claim 4, wherein the playing area is oblong in shape, and including a transversely extending barrier spaced inwardly from the end of the playing area and formed with an aperture of lesser dimensions than the playing piece into which the latter may enter but is prevented from passing therethrough.

18. A combination as in claim 17, wherein the permanent-magnet playing piece is located in between the barrier and the end wall of the playing area and including a non-magnetic playing piece disposable on the opposite side of said barrier from the magnet playing piece and extending into said aperture in position to be struck by the magnet playing piece and moved thereby over the playing area on its side of the barrier.

19. A combination as in claim 4, wherein the said board is oblong in shape and includes in inwardly spaced relation from each end thereof a vertically disposed partition extending between the side walls and formed with a centrally located aperture, and wherein a scoring area for the game of shuffleboard is marked off in the enclosure inwardly adjacent to each partition.

20. A combination as in claim 4, wherein the playing area is adapted to simulate an area for playing the game of croquet, and is marked off with representations of wickets and opposite end stakes arranged as in the game of croquet.

21. A combination as in claim 4, wherein the board is oblong shaped and adapted to simulate an area for playing the game of croquet, and including non-magnetic structures formed and relatively disposed within the enclosure to resemble the end stake and wicket layout as in the game of croquet.

22. A combination as in claim 4, wherein the playing area is adapted for playing a game simulating the game of Ping-pong, and wherein the area is formed with a centrally located transversely extending depression having a width slightly greater than the largest dimension of the playing piece, whereby the latter may become lodged in said depression.

23. A combination as in claim 4, wherein the bottom wall of the enclosure is formed at each end and substantially medially thereof with transversely extending depressions each having a width slightly greater than the largest dimension of the playing piece, whereby the medial depression is representative of the net used in the game of Ping-pong and the playing area between the end depression represents the top surface of a Ping-pong table.

24. A combination as in claim 4, including a plurality of permanent-magnet elements arranged in fixed positions in juxtaposed relation to said playing area, with their polar axes perpendicular thereto, and in a spaced-apart relation whereby their fields of magnetic flux substantially fill the area therebetween and thereby create a barrier to the free movement of the playing piece in such area.

25. A combination as in claim 4, wherein an irregularly winding track element is arranged in said enclosure, said track element being of a width less than the width of the playing piece.

26. A combination as in claim 4, including means secured to the bottom wall for supporting the latter in an inclined position, structures provided within an area of the enclosure in staggered relation to one another and comprising each a station to intercept and arrest the playing piece, and means outside the area of said structures for guiding the playing piece uninterruptedly from one end of the enclosure to the other.

27. A combination as in claim 4, wherein the bottom wall is formed with a recess to receive and hold a magnet, and the top wall is formed with an aperture in vertical alignment with said recess.

References Cited by the Examiner

UNITED STATES PATENTS

| | | | |
|---|---|---|---|
| 2,528,938 | 11/50 | Wolf | 46—238 X |
| 2,716,028 | 8/55 | Yaeger | 273—85 |
| 2,735,682 | 2/56 | Sweet | 273—85 |
| 2,791,210 | 5/57 | Vog et al. | 124—16 |
| 2,837,077 | 6/58 | Frazelle | 124—16 |
| 2,940,216 | 6/60 | Koch | 46—238 |
| 2,956,807 | 10/60 | Luchsinger | 46—239 X |
| 2,995,372 | 8/61 | Hines | 46—240 X |
| 3,091,459 | 5/63 | Lindman | 46—240 X |

FOREIGN PATENTS

| | | |
|---|---|---|
| 836,462 | 5/52 | Germany. |

DELBERT B. LOWE, *Primary Examiner.*